(12) United States Patent
Jethi et al.

(10) Patent No.: US 8,291,439 B2
(45) Date of Patent: Oct. 16, 2012

(54) DATA PLATFORM WEB SERVICES APPLICATION PROGRAMMING INTERFACE

(75) Inventors: Rashesh J. Jethi, Fremont, CA (US); Venkatesan Raghavan, Oakland, CA (US)

(73) Assignee: Convergys Information Management Group, Inc., Cincinnati, OH (US)

( * ) Notice: Subject to any disclaimer, the term of this patent is extended or adjusted under 35 U.S.C. 154(b) by 1343 days.

(21) Appl. No.: 11/859,590

(22) Filed: Sep. 21, 2007

(65) Prior Publication Data

US 2008/0092150 A1    Apr. 17, 2008

Related U.S. Application Data

(60) Provisional application No. 60/826,500, filed on Sep. 21, 2006.

(51) Int. Cl.
*G06F 9/44* (2006.01)
(52) U.S. Cl. ...................................................... 719/328
(58) Field of Classification Search .................. 719/310, 719/328
See application file for complete search history.

(56) References Cited

U.S. PATENT DOCUMENTS

| | | | |
|---|---|---|---|
| 5,243,643 A | 9/1993 | Sattar et al. | |
| 6,075,843 A | 6/2000 | Cave | |
| 6,173,437 B1 | 1/2001 | Polcyn | |
| 6,868,441 B2 * | 3/2005 | Greene et al. | 709/220 |
| 6,922,685 B2 * | 7/2005 | Greene et al. | 1/1 |
| 6,990,513 B2 * | 1/2006 | Belfiore et al. | 709/203 |
| 7,263,551 B2 * | 8/2007 | Belfiore et al. | 709/219 |
| 7,454,462 B2 * | 11/2008 | Belfiore et al. | 709/203 |
| 2002/0176378 A1 * | 11/2002 | Hamilton et al. | 370/328 |
| 2004/0148343 A1 * | 7/2004 | Mottes | 709/203 |
| 2005/0057560 A1 * | 3/2005 | Bibr et al. | 345/418 |
| 2005/0193361 A1 * | 9/2005 | Vitanov et al. | 716/19 |
| 2005/0246415 A1 * | 11/2005 | Belfiore et al. | 709/203 |
| 2006/0030315 A1 * | 2/2006 | Smith et al. | 455/432.3 |

OTHER PUBLICATIONS

Office Action dated Nov. 26, 2008 for U.S. Appl. No. 10/923,442.
Office Action dated May 13, 2009 for U.S. Appl. No. 11/552,117.

* cited by examiner

*Primary Examiner* — Van Nguyen
(74) *Attorney, Agent, or Firm* — Foley & Lardner LLP

(57) ABSTRACT

A system and method for implementing functions customized for a branded company are disclosed. A data platform includes a function database which initially receives, and stores, a standardized interface module, such as an application programming interface (API). The standardized interface module includes a plurality of elements, a subset of the elements required for function implementation and a second subset of the elements which can optionally be used to implement a function. A creation module communicates with the function database and modifies the standardized interface module, such as by selecting or removing optional elements from the standardized interface module to create a brand-specific interface. As the brand-specific interface includes the required elements and optional elements, a single system designed to process the required elements and the optional elements in the standardized interface can be used to implement multiple brand-specific interfaces which include different optional components.

17 Claims, 5 Drawing Sheets

DATA PLATFORM WEB SERVICES APPLICATION PROGRAMMING INTERFACE

CROSS REFERENCE TO RELATED APPLICATIONS

This application claims priority under 35 U.S.C. §119(e) from U.S. Provisional Application No. 60/826,500, filed Sep. 21, 2006, which is incorporated by reference herein in its entirety.

BACKGROUND

1. Field of Art

The present generally relates to the field of data services for wireless networks, and more specifically to brand-specific customization and implementation of wireless functions.

2. Description of the Related Art

A company can leverage the strength of its brand by offering wireless services. Offering wireless services provides a branded company with an additional revenue stream, an additional channel for customer communication and deeper customer relationships and/or enhanced customer loyalty initiatives. Currently, many companies have become Mobile Virtual Network Operators (MVNOs) to extend their brand into the wireless domain. Because MVNOs do not generally have dedicated wireless networks they often rely on Mobile Virtual Network Enablers (MVNEs) to provide data and voice networks as well as wireless functions such as order management, customer billing, application management or other customer or support services. This also allows MVNEs to distribute fixed costs and administrative overhead over a greater number of wireless subscribers by aggregating the demand of multiple MVNOs.

However, to carry out these roles, MVNEs must provision and manage services provided by different networks and by different third party providers. In the case of data services, MVNEs must communicate with various types of data providers, such as ringtone providers, streaming content providers and/or messaging providers. To allow branded companies to customize data services offerings, MVNEs must be able to interoperate with different data providers associated with different branded companies. However, various data providers generally have different operational requirements and protocols and different branded companies may implement different variations of a wireless function.

SUMMARY

One embodiment of a disclosed system and method uses a function database and a creation module to customize a wireless function for brand-specific implementation. In an embodiment, the function database includes a standardized interface module, such as an application programming interface (API). The standardized interface module includes required components and optional components. The creation module generates a brand-specific interface from the standardized interface module by selecting or removing one or more optional components. Hence, the brand-specific interface includes at least the required components. A translation engine communicates with the function database and associates a branded company with a generated brand-specific interface. The translation engine also identifies data requests from the branded company so that the brand-specific interface is used to process those requests. Use of the standardized interface module including required components allows a centralized mobile virtual network enabler (MVNE) to execute the brand-specific interface while the optional components allow individual branded companies to customize function execution.

In one embodiment, a standardized interface module, including required components and optional components, is received. A brand-specific interface which includes the required components and a subset, or none, of the optional components is then generated. For example, optional components are selected or removed from the standardized interface module according to criteria from a branded company. The brand-specific interface is then associated with the branded company and stored. For example, a branded company identifier is generated to identify the branded company and associated with the brand-specific interface; thus, when the branded company identifier is received, the associated brand-specific interface module is accessed. Hence, use of a standardized interface module including required components allows similar execution of multiple functions, while including optional components in the standardized interface module allows different branded companies to customize function execution based on company-specific requirements. For example, different branded companies can select different optional components to generate company-specific output.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

Figure 1:
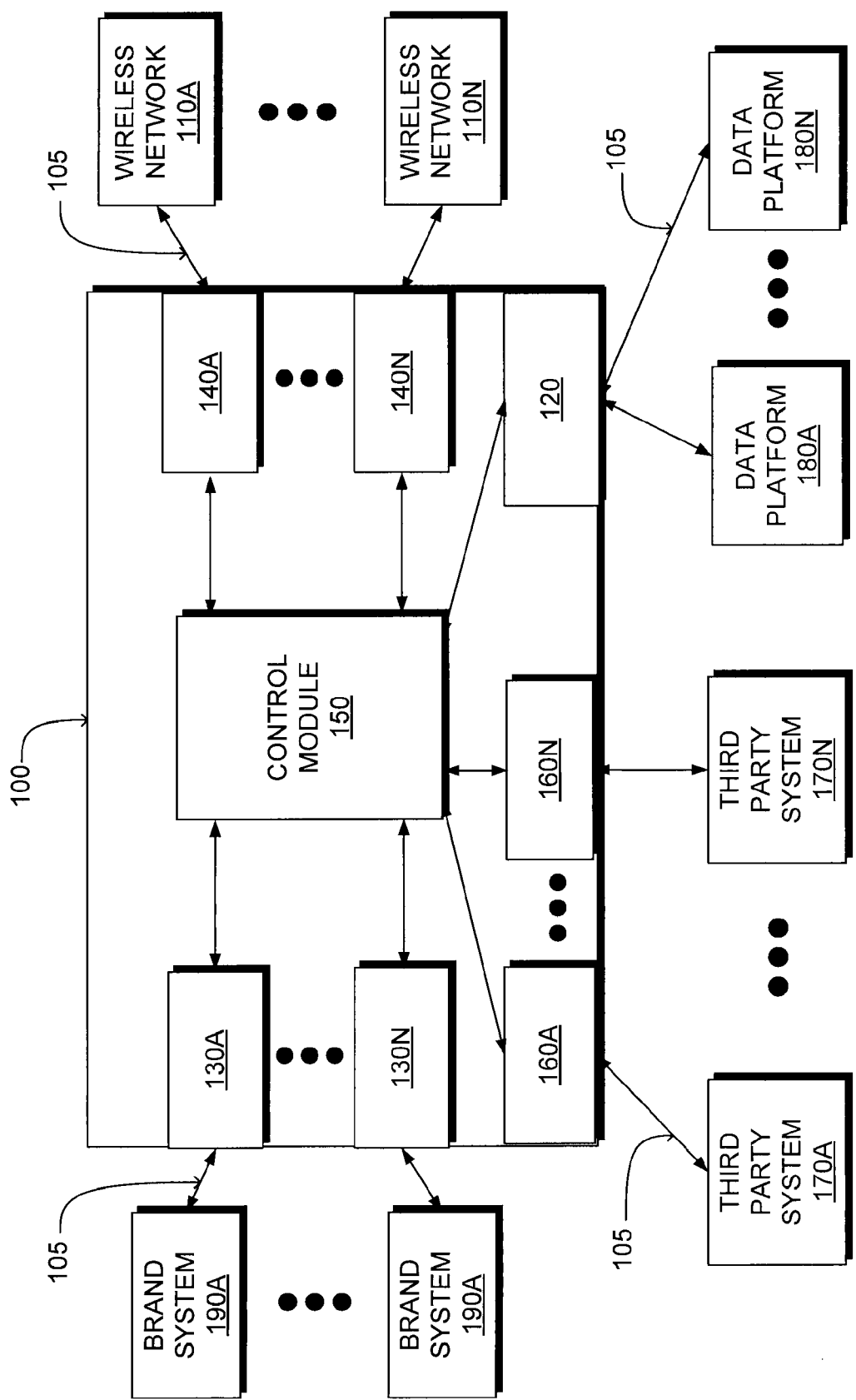
FIG. 1 is a block diagram of an architecture for providing branded wireless services according to one embodiment of the invention.

A system and method for providing centralized execution of customer-specific wireless functions is disclosed herein. For purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will be apparent from the description below. In addition, the present invention is not described with reference to any particular programming language. It will be appreciated that a variety of programming languages may be used to implement the teachings of the invention as described herein.

System Architecture

FIG. 1 illustrates a block diagram of an architecture for providing branded wireless services according to one embodiment of the invention. The architecture includes a Mobile Virtual Network Enabler (MVNE) system 100, one or more brand systems 190, one or more wireless networks 110, one or more third party systems 170 and one or more data platforms 180. One or more network connections 105 allow the MVNE system 100 to communicate with the branded system 190, the third party system 170, the data platform 180 and/or the wireless network 110. Additionally, the MVNE system uses various interfaces, 120, 130, 140, 160, which are further described below, to communicate data between wireless network 110, brand system 190, third party system 170 or data platform 180 to a control module 150.

Wireless networks 110A-110N comprise networks capable of carrying mobile voice and/or data traffic, including the equipment and communication capabilities. For example, wireless network 110A comprises wireless base stations, mobile switching centers, messaging services centers (MSCs), such as short MSCs, multimedia MSCs, or similar MSCs, home location registers (HLRs) and/or a wired line carrier. Wireless networks 110 enable services, such as, for example, provisioning, call detail record (CDR) retrieval, trouble ticketing, coverage, suspension, wireless number portability (WSP), operational support systems (OSS) integration, business support systems (BSS) integration or similar functionality. Wireless networks 110 are adapted to communicate with one or more data platforms 180 and request and/or retrieve data from a data platform 180 as needed. When a wireless customer of a brand system 190 uses a wireless device (not shown) to request data or initiate a voice call, the call or request and associated response are carried by one or more wireless networks 110. Hence, the wireless networks 110 allow a brand system 190 customer to use any electronic device capable of initiating and receiving wireless phone calls and/or data, such as a mobile phone, a smart phone, a personal digital assistant (PDA), a mobile communication device (e.g., a Blackberry™ or Goodlink™ e-mail device or similar device.

As shown in FIG. 1, brand systems 190A-190N comprise one or more entities providing marketing, customer acquisition and branding of wireless offerings. However, brand system 190 does not include components for carrying out customer management and services associated with providing wireless services. Instead, one or more of the customer management or provider services are provided by the MVNE system 100. Hence, the MVNE system 100 connects customers of brand system 190 to one or more wireless networks 110 and provides management and/or support services for wireless voice and/or data services to brand system 190 customer.

The third-party systems 170A-170N comprise application software created by one or more vendors. In one embodiment, third-party systems 170A-170N comprise proprietary application software created by various vendors. For example, third-party systems 170 comprise billing or management software such as Siebel Communications™ from Siebel Systems, Inc. or Infinys™ Genefa™ software from Convergys Corporation. In one embodiment, the MVNE system 100 is adapted to communicate with multiple third-party systems 170 that offer similar or overlapping services. For purposes of illustration, FIG. 1 shows two third-party systems 170A, 170N, although any number of third-party systems 170 can communicate with the MVNE system 100.

One or more data platforms 180A-180N are adapted to communicate with the MVNE system 100. In one embodiment, a data platform 180 comprises one or more servers, each connected to one or more forms of content. In an embodiment, the one or more servers are specifically provisioned for a brand system 190 customer of an MVNE 100 and access third-party content and/or content unique to the brand system 190. For example, for a branded company offering media-themed wireless services, the brand company offers exclusive clips and programming for its users over a proprietary data server included in a data platform 180. In an embodiment, one or more data platforms 180 are provided by a third party data system provider such as Converse Technology Inc. or Openwave Systems, Inc. In an embodiment, when a brand company subscriber signs up for data services, modifies an existing data plan or terminates data service or other account modification, the MVNE system 100 carries out the associated transactions on the appropriate data platform 180.

In one embodiment, when a user accesses content through a data platform 180, a data request is communicated from the user's wireless device to the data platform 180 using a wireless network 110. Although a wireless network 110 can carry traffic without directly involving the MVNE system 100, in one embodiment, before providing requested content to a user, the MVNE system 100 is checked to ensure that the user is authorized to receive the content, such as by verifying that the user's service plan includes the requested action or another suitable validation technique.

In various embodiments, the MVNE system 100 comprises a single computer or a plurality of computers adapted to communicate with each other. In one embodiment the computers comprising the MVNE system 100 comprise general-purpose computers configured to perform wireless voice and/or data management and/or support services. In an embodiment, the MVNE system 100 directly provides a subset of management services such as customer management, order management, applications management, billing services or similar services. Alternatively, MVNE system 100 comprises logic for controlling or interfacing with one or more third-party systems 170 which implement management services.

In one embodiment, the MVNE system 100 includes a data platform services adapter 120, one or more brand system interfaces 130A-130N, one or more wireless network interfaces 140A-140N and one or more third-party system interfaces 160A-160N. The data platform services adapter 120 communicates with one or more data platforms 180. The brand system interface 130 allows the MVNE system 100 to communicate with one or more brand systems 190. The wireless network interface 140 allows the MVNE system 100 to interact with one or more wireless networks 110. The third-party system interface 160 enables the MVNE system 100 to interact with one or more third-party systems. For purposes of illustration, FIG. 1 shows the MVNE system 100 including two third-party system interfaces 160A, 160N, two brand system interfaces 130A, 130N and two wireless network interfaces 140A, 140N; however, in other embodiments, the MVNE system 100 includes multiple brand system interfaces 130, third-party system interfaces 160 and/or wireless network interfaces 140. The brand system interface 130, wireless network interface 140, third-party system interface 160 and/or the data platform interface 120 comprises a protocol for managing the data exchange between the MVNE system 100 and the brand system 190, the wireless network 110, the third-party system 160 and the data platform 180, respectively. The appropriate protocol is carried out using one or more network connections 105. The network connections 105 comprise a public network, such as the Internet, a private Local Area Network (LAN) or Wide Area Network (WAN), and can comprise a wired communication link, a wireless communication link or a combination of wired and wireless communication links.

The MVNE system 100 also includes a control module 150 which controls the MVNE system 100 and communicates with the data platform adapter 120, brand system interface 130, the wireless network interface 140 and the third-party system interface 160. In one embodiment, the control module 150 comprises multiple software processes for execution by a processor (not shown) and/or firmware applications. The software and/or firmware processes and/or applications can be configured to operate on a general purpose microprocessor or controller, a field programmable gate array (FPGA), an application specific integrated circuit (ASIC) or a combination thereof. In another embodiment, the control module 150 comprises portions or sub-routines of a software or firmware application that communicates with the data platform adapter 120, brand system interface 130, the wireless network interface 140 and the third-party system interface 160 and/or controls MVNE system 100 actions. Moreover, other embodiments can include different and/or additional features and/or components than the ones described here.

Additionally, in various embodiments, the MVNE system 100 also includes logic for controlling front-end and/or back-end components of a wireless network 110. Front-end components may include, for example, a wireless application framework (WAF) and authentication system, a content delivery system, a messaging system, an interactive voice response unit (IVRU), a call center system, a customer relationship management (CRM) application and master customer database (DB), a product catalog system and a world-wide web/wireless application protocol (WAP) and authentication system. Examples of back-end components include a personal identification number (PIN) management system, an equipment serial number (ESN) management system, a subscriber identity module (SIM) management system, a short message service (SMS) gateway, a billing/rating and call detail record (CDR) management system, a reporting system, an enterprise resource planning (ERP) taxation system, a bill finishing and printing system, a mediation manager system, an prepaid gateway system or a prepaid service control point (SCP) system.

The MVNE system 100 supports wireless offerings of multiple brand companies using one or more wireless networks 110 and one or more data platforms 180. To support these different companies, the MVNE system 100 communicates and interacts with multiple brand systems 190, wireless networks 110, third-party systems 170 and data platforms 180, determines what brand system 190 is associated with each communication and manages traffic between the different elements. The data platform services adapter 120 handles network traffic relating to data services. For convenience, services such as billing or provisioning services provided in support of providing data services are herein referred to as "data support services." Additionally, services such as account maintenance, item purchasing, identity verification or similar services for establishing or maintaining a wireless account are referred to herein as "wireless functions."

Figure 2:
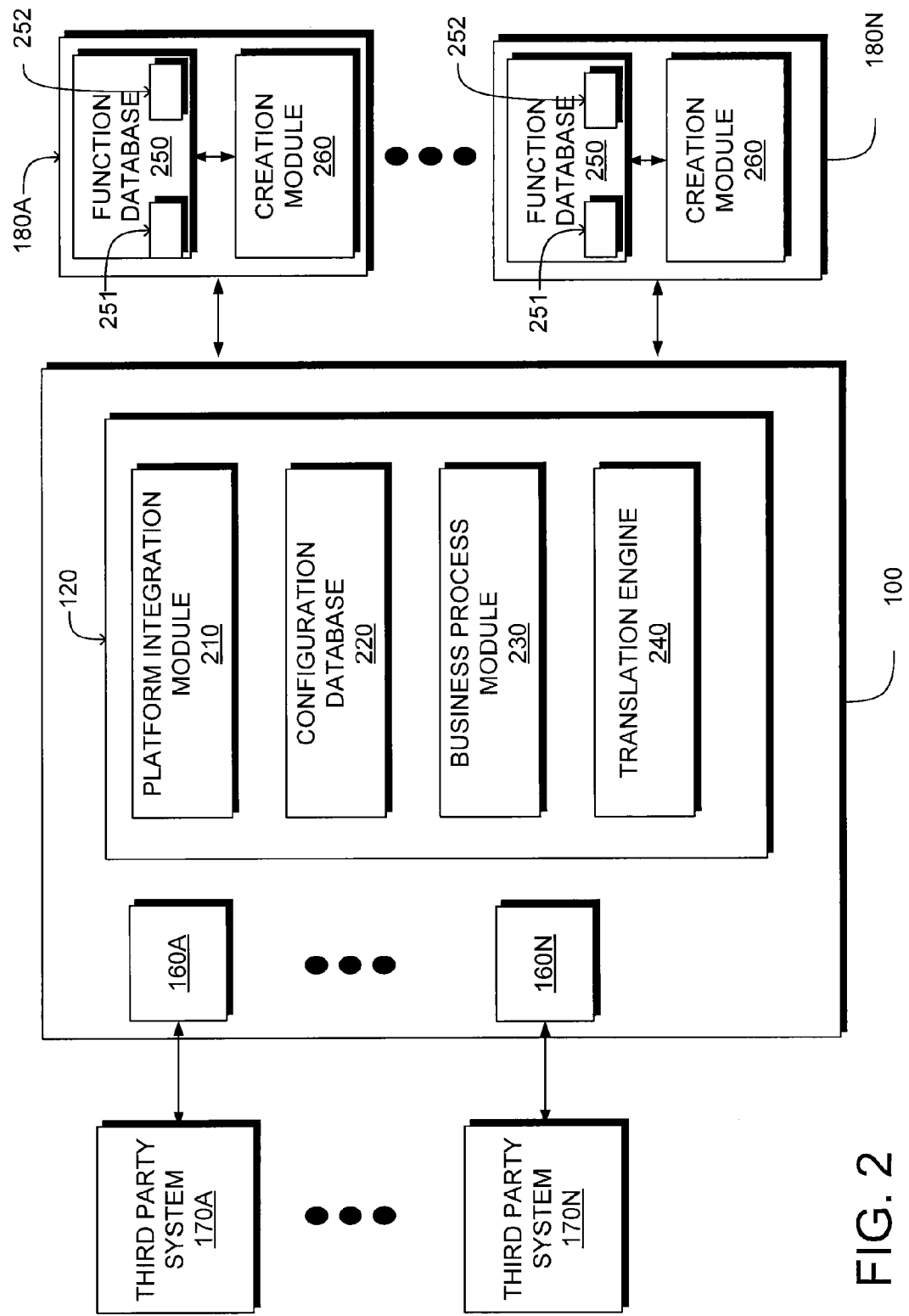
FIG. 2 is a block diagram of a data platform services adapter according to one embodiment of the invention.

FIG. 2 is a block diagram of a data platform services adapter 120 according to one embodiment of the invention. The data platform services adapter 120 is included in the MVNE system 100 and is adapted to communicate with one or more third-party interface systems 160A-N which communicate with one or more third-party systems 170A-170N, such as CRM systems, and one or more data platforms 180A-180N. The data platforms 180 include a function database 250 describing functions associated with services or content provided by the data platform 180 and a creation module 260 adapted to communicate with the function database 250, as well as additional elements such as data servers (not shown), where provisioning and/or other requests are implemented. In one embodiment, these requests are associated with functions such as activating, supporting and/or terminating the data services of a brand company wireless customer. Information relevant to these requests is received and transmitted from a third party system 170 to the MVNE system 100.

In one embodiment, a third party system 170, such as a CRM system, comprises a system configured to support sales, provisioning, billing, marketing or other customer-service transaction, and store data associated with the transaction. Commonly, the third party system 170 is implemented using a combination of hardware and software. For example, general purpose computer hardware running multiple software processes is used to implement the third party system 170 as a software process. Alternatively, the third party system 170 is implemented using multiple software processes running on a plurality of separate computer systems as a distributed computer system.

The data platform services adapter 120 includes a platform integration module 210, a configuration database 220, a business process module 230 and a translation engine 240. However, in other embodiments, the data platform services adapter 120 includes different and/or additional features and/or components than the ones described here.

The business process module 230 comprises logic for handling data support service requests and for determining actions to be taken by the data platform services adapter 120 to implement the requests. The requests originate from a variety of sources, such as the third party system 170, such as a CRM system, a billing system, a retail system, a consumer system or another system capable of transmitting service requests. In an embodiment, data and requests within the MVNE system 100 are represented in various independent formats. Alternatively, data and requests are represented in a canonical data format including objects relevant to the request, such as customer identifier, customer contract, customer contact data, customer plan, data request or other data associated with the customer and/or data request. Objects in the canonical data form are associated with additional network data, such as network entity, customer entity, subscriber entity, plan entity or other data associated with the network configuration. The business process module 230 then maps the received request into one or more operational tasks for implementing the request. For example, if the business process module 230 receives a request to allocate data services to a customer, the business process module 230 requests information about the customer, provides customer information to a third party system 170, determines the data platform 180 affected or specified by the request and interacts with additional elements necessary to carry out the request. As the data platform services adapter 120 processes requests from multiple brand systems 190, when a request is received, the business process module 230 determines the third party system 170, the data platform 180 or the other platform elements utilized and how to interact with the systems, platforms or other elements.

The configuration database 220 comprises associations between brand systems 190 and third-party vendors or data platforms 180 selected by the brand system 190. The configuration database 220 receives requests from the business process module 230, and communicates the association corresponding to the received request back to the business process module 230. The configuration database 220 also includes the communication requirements and/or protocols associated with the third-party vendors or data platforms 180. Alternatively, communication requirements and/or protocols needed to implement a request are stored in association with additional characteristics of an incoming request, such as the selected service tier or the customer wireless network. The configuration database 220 comprises a hard disk drive, a flash memory device or other suitable mass storage device. Further, the configuration database 220 can be a volatile storage device (e.g., dynamic random access memory (DRAM), static random access memory (SRAM) or another suitable memory device), a non-volatile storage device or a combination of a non-volatile storage device and a volatile storage device.

When a request is received by the business process module 230, the business process module 230 identifies a brand company associated with the received request and then retrieves corresponding platform, system and format specifications from the configuration database 220. For example, data stored in the configuration database 220 specifies that when a request is received from brand company B, a data provisioning request is sent to data platform C, specifically to data platform elements server D and server E. Data stored in the configuration database 220 also provides that calls to server D are made using a Common Object Request Broker Architecture (CORBA) and calls to server E are made using a Wireless Access Protocol (WAP).

The business process module 230 further communicates a request to the translation engine 240 including the tasks and communication requirements retrieved from the configuration database 220. The translation engine 240 then generates calls in the appropriate format for the appropriate destination using the received request. For example, the translation engine 240 creates a call using data transformation, protocol information and application protocol interface (API) information retrieved from the configuration database 220. In one embodiment, the translation engine 240 also executes the calls to external systems such as the third party system 170 or data platform 180. As the translation engine 240 handles multiple calls on behalf of various brand systems, different calls are identified by unique transaction identifiers so that traffic to and from the translation engine 240 is routed to the appropriate destination.

In one embodiment, the translation engine 240 includes data describing a plurality of functions, such as application programming interface (API) information. In one embodiment, the data describing the plurality of functions comprises data identifying one or more inputs, such as data describing input type, data describing input format or other data describing how a function receives input. In another embodiment, the data describing the plurality of functions also includes data identifying one or more outputs, such as data describing output format, data describing output type or other data describing characteristics of a function output. For example, the translation engine 240 includes extensible markup language (XML) data describing input data, output data and how to execute the plurality of functions, such as an XML schema associated with different functions. In one embodiment, the stored API information comprises XML schemas for different functions, such as subscription activation, identify verification, check or credit card charging or other functions used in wireless communication systems. The stored XML schemas include a plurality of components, where a subset of the components are required for execution of the function and a second subset of the components are optional and are included or excluded as specified by various branded companies.

Additionally, the translation engine 240 also includes data associating one or more functions with a brand system 190, allowing retrieval of data describing a plurality of functions associated with a brand system 190. This allows different brand systems 190 to differently execute functions based on data associated with the brand system. This allows different brand systems 190 to provide customized functions while also using common resources to execute the functions.

Because the data platform services adapter 120 interacts with a plurality of data platforms 180, when a brand company or MVNO chooses a data platform 180, or data platforms 180, the platform integration module 210 establishes the brand or MVNO customer with the corresponding data platform 180 selections. When connections between the data platform services adapter 120 are already established, an instance of the brand company customer or MVNO customer is configured on the data platform 180. For example, when a brand company is established, the platform integration module 210 associates a unique identifier with the brand company and communicates the unique identifier to the data platform 180. The unique identifier specifies data platform 180 transactions associated with brand company customers. This identification method leverages pre-existing connections between the data platform services adapter 120 and the data platform 180 to provide customized data offerings for the brand company.

A different protocol is then used to introduce a new data platform 180 to the MVNE system 100. Data, such as program code, specific to the data platform 180 is created to allow the MVNE system 100 to communicate with the new data platform 180. The data platform 180 specific data specifies data platform 180 protocol and communication requirements. Relevant data is communicated to the configuration database 220 (e.g., the brand company's data platform selections) and the translation engine 240 (e.g., new protocols, new data transformations and API data for connecting to the new data platform 180).

Further, to allow multiple brand companies to customize function implementations, various data platforms 180 include a function database 250. In one embodiment, the function database 250 includes a standardized interface module 251 which includes required components and a plurality of optional components. The standardized interface module 251 describes how the data platform 180 implements different functions and allows platform-specific function customization. The creation module 260 is adapted to communicate with the function database 250 and communicates data or instructions to the function database 250 describing modifications to the interface module. Hence, the local function database 250 and creation module 260 allow different data platforms 180 to differently implement functions. This customized implementation allows brand systems 190 to share resources while still providing customized services to subscribers or customers. Modifying the optional components of the standardized interface module 251 allows multiple brand systems 190 to use resources configured to execute the standardized interface module 251 while also varying the required and/or generated data according to specialized brand system 190 criteria.

For example, the creation module 260 specifies which optional components from the standardized interface module 251 are used to implement a function described by the standardized interface module 251, creating a brand-specific interface 252. Specifying one or more optional components allows the creation module 260 to vary the input and/or output parameters to a function, altering the input requested and/or the output produced according to different requirements. The brand-specific interface 252 is then stored. In one embodiment, the brand-specific interface 252 is included in the function database 250. Alternatively, the brand-specific interface 252 is stored in a separate storage device included in the data platform 180. In another embodiment, the brand-specific interface 252 is communicated to MVNE system 100 and stored in the configuration database 220 or the translation engine 240.

The MVNE system 100 is then notified of the generated brand-specific interface 252 (e.g., by receiving a notification message, by receiving a copy of the brand-specific interface 252 or another suitable notification method). The MVNE system 100 then modifies the translation engine 240 to associate the brand-specific interface 252 with the data platform 180 which created the brand-specific interface 252. For example, a data platform 180 identifier is associated with the brand-specific interface 252 and the association is then stored in the translation engine 240 This allows brand companies to customize function execution, while still allowing centralized function execution control by the MVNE system 100.

For example, the MVNE system 100 communicates a standardized interface module 251 describing a plurality of functions to multiple data platforms 180. The data platforms 180 initially store the standardized interface module 251 in the local function database 250. The creation modules 260 on multiple data platforms 180 then modify the locally stored standardized interface module 251 to generate a brand-specific interface 252 describing how the data platform executes one or more functions. For example, the creation module 260 selects optional components from the standardized interface module 251 identifying specific input variables to request when executing a function, or removes specific output variables to prevent presentation of certain data. The brand-specific interface 252, or data describing the brand-specific interface 252, is then communicated to the MVNE system 100. The MVNE system 100 then modifies the translation engine 240 to associate the brand-specific interface 252 with the data platform 180 which generated the brand-specific interface 252.

Figure 3:
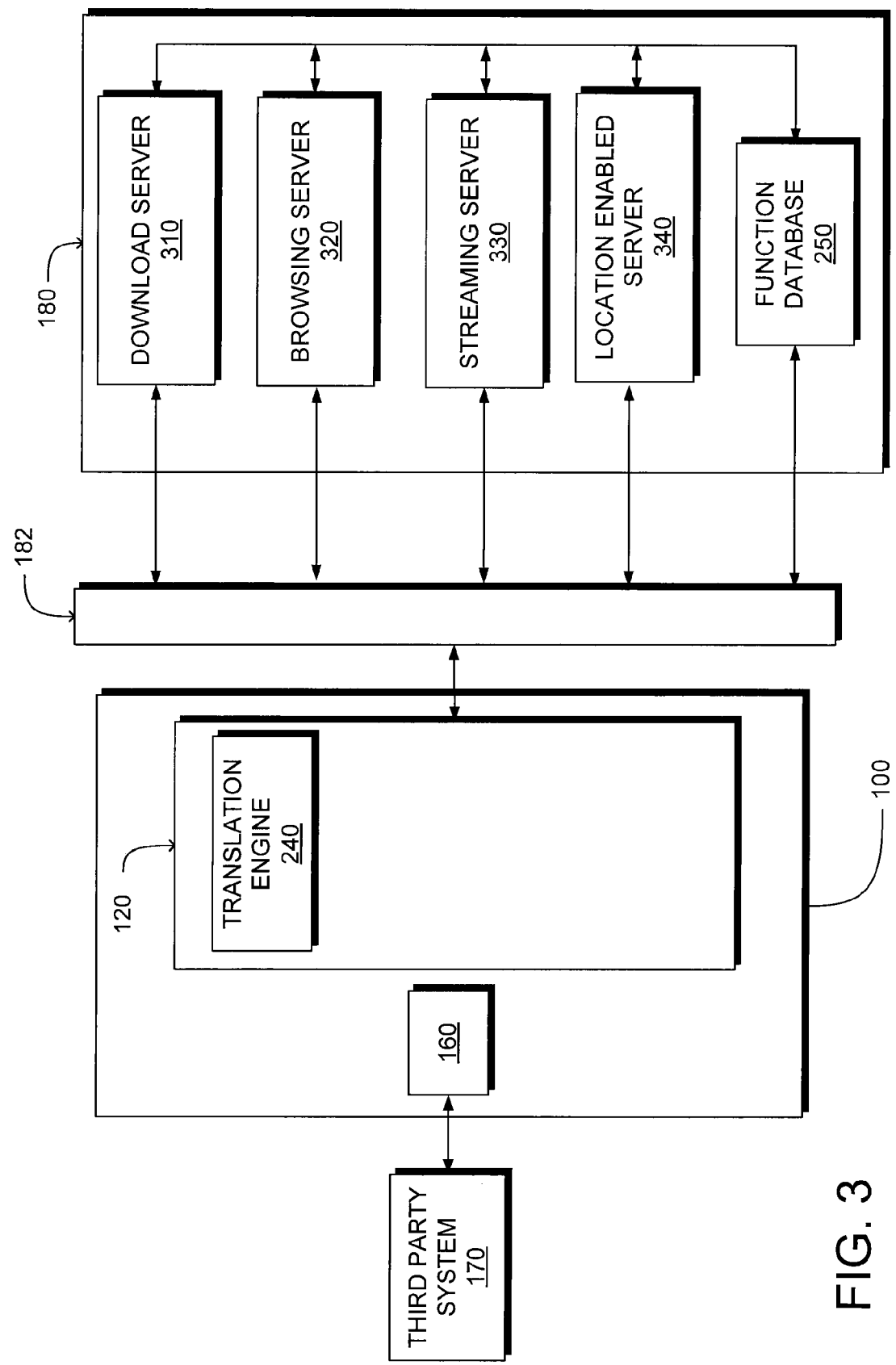
FIG. 3 is a block diagram of a MVNE system communicating with a plurality of data platforms according to one embodiment of the invention.

FIG. 3 is a block diagram of an MVNE system 100 communicating with a data platform 180 according to one embodiment of the invention. The MVNE system 100 includes a data platform services adapter 120 which interfaces with multiple elements of the data platform 180 to activate, support or terminate the data services of a brand company customer. In one embodiment, the data platform services adapter 120 communicates with a download server, browsing server 320, a streaming server, a location enabled server 340 and a function database 250 included in the data platform 180. Data associated with service activation, support and/or termination is communicated between a third party system 170, such as a CRM system, and the MVNE system 100. In one embodiment, the MVNE system 100 uses the third-party interface 160 to communicate with the third party system 170.

In one embodiment, a data administration layer 182 is also included to facilitate communication between the data platform services adapter 120 and data platform 180 elements. For purposes of illustration, the data administration layer 182 is shown in FIG. 3 as a discrete module. However, in alternative embodiments, the data administration layer 182 is included in the data platform 180 or the MVNE system 100.

The data administration layer 182 comprises an interface layer handling authentication and session management in transactions of the data platform 180 and mediates transactions between the data platform services adapter 120 and the download server 310, browsing server 320, streaming server 330, location enabled server 340 and/or function database 250. The data administration layer 182 also controls security and access control to the download server 310, browsing server 320, streaming server 330, location enabled server 340 and/or function database 250. In one embodiment, the data administration layer 182 also determines which classes of services a user can access. In one embodiment, the data administration layer 182 comprises an authentication, authorization and accounting (AAA) layer. In various embodiments, additional layers are also included, such as layers providing services, applications or content (e.g., a mapping server, a game server or similar server).

In one embodiment, content is locally served from one of the download server 310, browsing server 320, streaming server 330 or location enabled server 340. For example, brand companies customize their customers' experiences by, for example, devising specific interfaces, menus and/or portals for their customers. The download server 310 stores static content, for example, ringtones, wallpaper or video clips. In one embodiment, the download server 310 is refreshed on a regular basis.

The browsing server 320 provides subscribers with the ability to browse internet uniform resource indicators (URIs). The browsing server 320 forwards a hypertext transfer protocol (HTTP) request entered in a wireless device to the Internet, retrieves the requested URI and returns the URI to the wireless device. In one embodiment, the data platform 180 also includes a messaging server (not shown) allowing users to engage in text messaging, voice messaging, ring-tone delivery, intra-private-label, brand customer messaging, inter-carrier messaging or similar messaging-type services.

The streaming server 330 provides streaming content to one or more wireless devices responsive to receiving a request for streaming content, such as a live video or audio feed. The streaming server 330 communicates with a content source such as a video feed or music feed from a satellite or internet radio source, or other streaming data source. The streaming server 330 also filters, transcodes and streams the requested data to the requesting wireless device, or devices.

In one embodiment, the data platform 180 also includes a location enabled server 340 that determines a user's location and provides data responsive to the user's location. For example, the location enabled server 340 determines a user's location and provides the user with data regarding restaurants, transportation schedules, stores or other data near the user's location.

The function database 250 includes data describing how the data platform 180 implements one or more wireless communication functions, such as the standardized interface module 251 and/or the brand-specific interface 252. For example, the function database 250 includes the brand-specific interface 252 which describes how a brand company implements a user authentication or payment processing function. Hence, the function database 250 allows different data platforms 180 to differently implement functions, such as by requesting different input or generating different output when a function is implemented by different data platform 180. This customization allows branded companies to implement functions in a company-specific manner while using the centralized MVNO architecture.

In one embodiment, one or more of the download server 310, browsing server 320, streaming server 330, location enabled server 340 and/or function database 250 provides requested content using a protocol determined by one or more characteristics of the content, requesting wireless device and/or the wireless network. One or more of the download server 310, browsing server 320, streaming server 330, location enabled server 340 and/or function database 250 provides the requested data via a wireless access protocol (WAP), multimedia message service (MMS), file transfer protocol (FTP), real time streaming protocol (RTSP) or other similar data communication format.

When a customer initiates, changes or terminates a data service, the data platform services adapter 120 communicates data to the appropriate data platform 180 elements and the third party system 170. For example, to activate a customer, information about the customer is passed to the data platform 180 in the format corresponding to the data platform 180. In one embodiment, this information comprises one or more of the customer's electronic serial number (ESN), mobile directory or dialing number (MDN) or mobile subscriber ID (MSID), as well as data plans and features selected by the customer. For example, a customer elects a package of basic or premium data services, a class of service or selects options related text messaging, e-mail, Internet browsing or streaming content downloading.

Information communicated to the data platform 180 is received by the data administration layer 182, which stores a subset of the communicated data in a customer profile. Messages regarding the options or features selected by the customer are provided to one or more of the download server 310, browsing server 320, streaming server 330, location enabled server 340 or function database 250. For example, if the customer selects a plan allowing for streaming video content, a message requesting allocation of streaming server 330 resources to the customer is transmitted to the data platform 180. Once activation is completed at the data platform 180, the data administration layer 182 sends a message to the data platform services adapter 120 that activation was successfully completed and this confirmation data is then sent to the third party system 170.

In one embodiment, the data platform services adapter 120 also completes other transactions in support of data services. For example, the data platform services adapter 120 implements customer maintenance transactions to change or update plan or customer information or query characteristics of a customer's existing data choices or preferences. When a customer attempts to change customer information, a request for details about the existing plan stored in the data administration layer 182 is transmitted from the data platform services adapter. In one embodiment, the data administration layer 182 evaluates whether the change requested is compatible with the existing plan. For example, if the existing plan is a service allowing for unlimited downloads, a request to add additional downloads is declined because the plan already includes this feature. As another example, if a customer changes their wireless device, the ESN of the new wireless device is transmitted to the data platform 180. Or if a customer phone number is changed, an updated MDN and/or MSID is provided to and stored by the data platform 180. Alternatively, a request to terminate service is communicated to the data platform 180 responsive to a customer request or to a customer's failure to pay a bill or at the end of a contract.

System Operation

Figure 4:
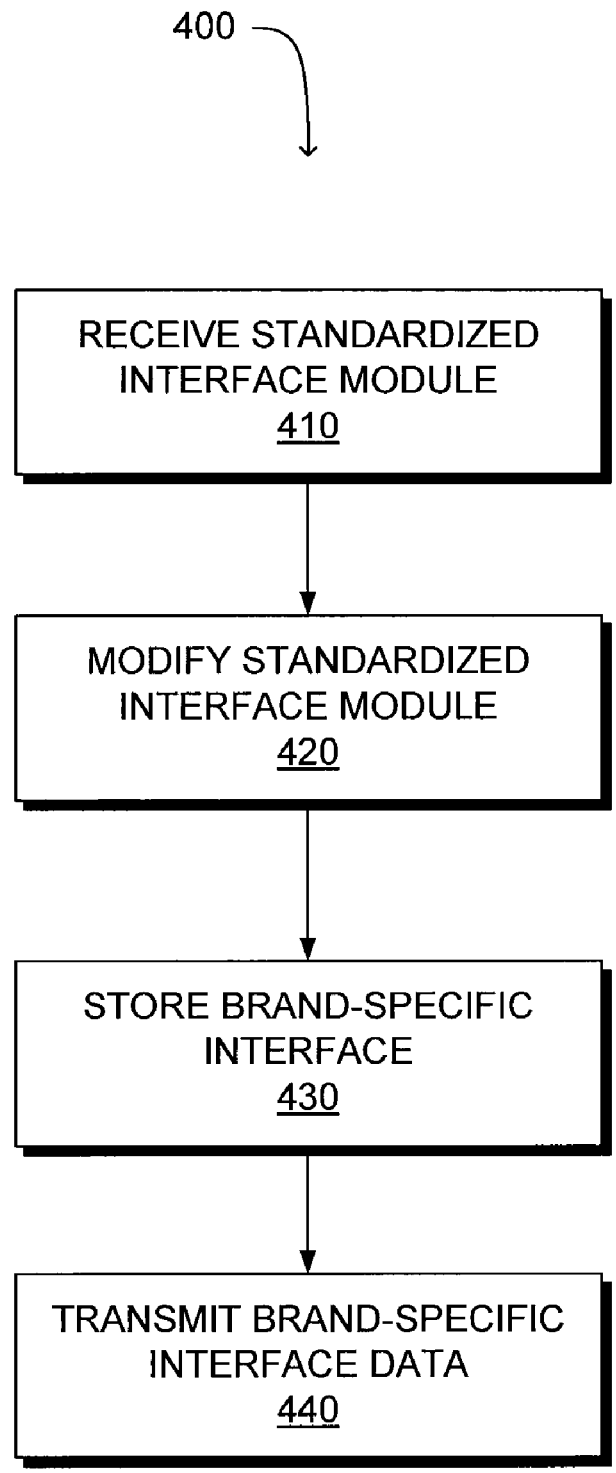
FIG. 4 is a flow chart of configuring a branded company-specific function using distributed resources according to one embodiment of the invention.

FIG. 4 is a flow chart of a method 400 for generating a brand customer-specific function using distributed resources according to one embodiment of the invention. In an embodiment, the steps of the method 400 are implemented by a microprocessor (not shown) executing software instructions that cause the described actions. Those of skill in the art will recognize that the method may be implemented in embodiments of hardware and/or software or combinations thereof. For example, instructions for performing the described actions are embodied or stored within a computer readable medium. Furthermore, those of skill in the art will recognize that other embodiments can perform the steps of FIG. 4 in different orders. Moreover, other embodiments can include different and/or additional steps than the ones described here.

Initially, a data platform 180 receives 410 a standardized interface module 251, such as a standardized application programming interface (API). In one embodiment, the standardized interface module 251 is received 410 from the MVNE system 100, or from a third party system 170 or other device adapted to communicate with the data platform 180 via a wireless link 105. The standardized interface module 251 describes one or more functions used for wireless data transmission, such as product sales, account maintenance, identity verification or similar data transmission or account management functions. In one embodiment, the standardized interface module 251 comprises a plurality of XML schema describing how to execute different functions. For example, the standardized interface module 251 includes an XML schema describing an account balancing function, an XML schema describing a customer identification function, an XML schema describing an account updating function or additional XML schemas describing other account maintenance functions.

The standardized interface module 251 is then modified 420 on the data platform 180 by a creation module 260 to create a brand-specific interface 252. In one embodiment, the standardized interface module 251 is modified 420 according to branded company specifications stored in the creation module 260 or communicated to the creation module 260 from a data platform 180 user or a brand system 190 user or administrator. This customization includes or excludes specified components of the standardized interface module 251 from the brand-specific interface 252

For example, the modification 420 specifies a subset of XML schema components used by a branded company to implement a function. For example, when the XML schema describes a function for displaying a product catalog, the modification 420 specifies certain components of the XML schema, such as promotional displays and pricing end dates used for branded company-specific function implementation. This modification 420 allows the standardized interface module 251 to include components required for function execution and optional components that are used, or not used, responsive to branded company selection. Requiring that certain components are used allows functions to be standardized, but also enables brand-specific function customization by selection, or removal, of optional components from the standardized interface module 251. Using different schemas for different functions allows brand-specific customization of different functions.

The brand-specific interface 252 is then stored 430 in the function database 250, or another storage device, of the data platform 180. In one embodiment, the data platform 180 stores 430 multiple brand-specific interfaces 252, allowing the data platform 180 to provide functions customized for multiple branded companies. After storage, data associated with the brand-specific interface 252 is transmitted 440 to the MVNE system 100. In one embodiment, the transmitted data comprises the brand-specific interface 252 and an identifier specifying the brand company, or companies, associated with the brand-specific interface 252, allowing the MVNE system 100 to locally implement functions described by the brand-specific interface 252. Alternatively, the transmitted data comprises an identifier specifying the data platform 180 including a brand-specific interface 252 associated with a branded company. This identifier causes the MVNE system 100 to transmit data associated with the branded company to the specified data platform 180, which applies the brand-specific interface 252 to the received data.

Figure 5:
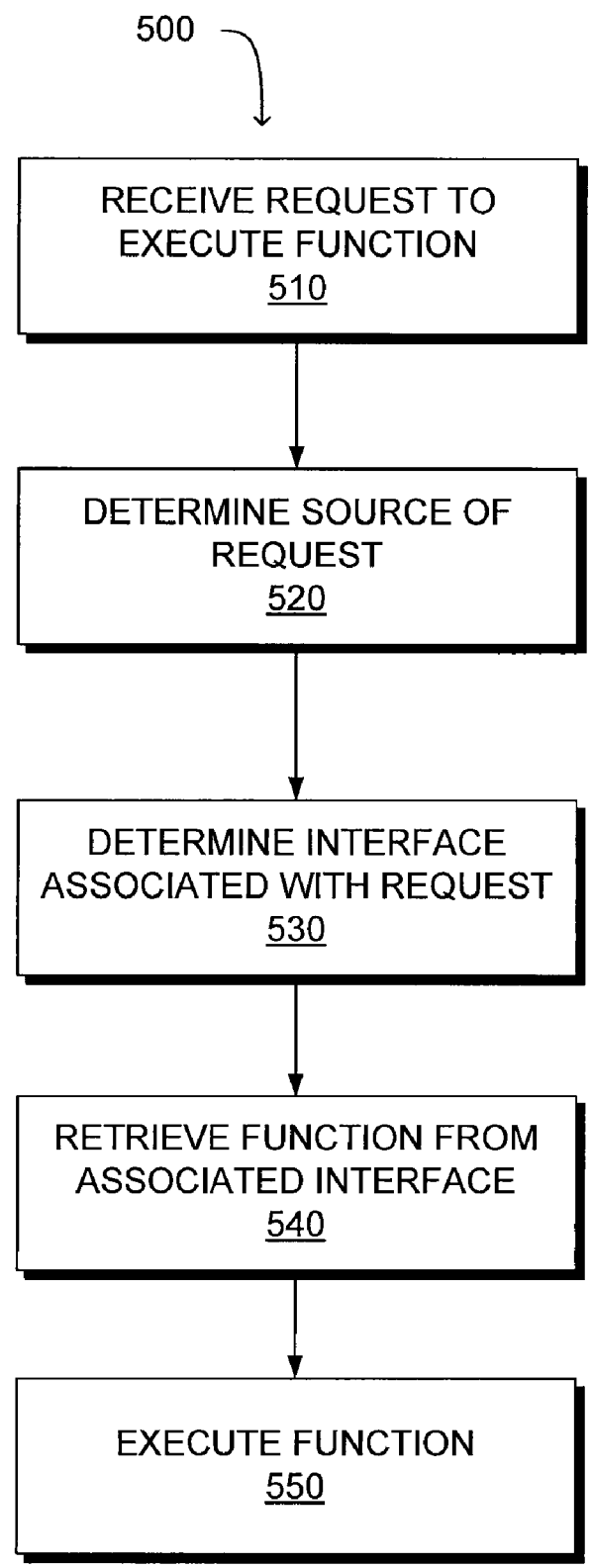
FIG. 5 is a flow chart of executing a branded company-specific function using distributed resources according to one embodiment of the invention.

FIG. 5 is a flow chart of a method 500 for executing a branded company-specific function using distributed resources according to one embodiment of the invention. In an embodiment, the steps of the method 500 are implemented by a microprocessor (not shown) executing software instructions that cause the described actions. Those of skill in the art will recognize that the method may be implemented in embodiments of hardware and/or software or combinations thereof. For example, instructions for performing the described actions are embodied or stored within a computer readable medium. Furthermore, those of skill in the art will recognize that other embodiments can perform the steps of FIG. 5 in different orders. Moreover, other embodiments can include different and/or additional steps than the ones described here.

Initially, a request to execute a function is received 510 by the MVNE system 100. Requests for function execution or other data are initially received 510 by the MVNE system 100 which then routes the received request to the appropriate data platform 180 and/or third party system 170. Thus, the MVNE system 100 then determines 520 the source of the request. In one embodiment, the MVNE system 100 examines an identifier included in the request which identifies the brand system 190, or other location, making the request. Alternatively, the MVNE system 100 applies an algorithm to the received request to generate an identifier specifying the brand system 190 where the request originated.

The MVNE system 100 then determines 530 a brand-specific interface 252 associated with the received request. In one embodiment, the MVNE system 100 compares the brand system 190 identifier with stored data associating brand-specific interfaces 252 with brand systems 190, such as a table including pairs of brand system 190 identifiers and brand-specific interfaces 252. For example, the brand system 190 identifier associated with the received request is compared to stored brand system 190 identifiers.

If the brand system 190 identifier associated with the received request matches a stored brand system 190 identifier, the corresponding brand-specific interface 252 is retrieved 540 from the configuration database 220, the translation engine 240, the function database 250 or other storage location. In one embodiment, retrieving 540 the brand-specific interface 252 comprises transmitting the request to the data platform 180 storing the brand-specific interface 252.

The brand-specific interface 252 is then used to execute 550 the requested function. By using the brand-specific interface 252 to execute 550 the function, optional components in the brand-specific interface 252 are used to modify function execution. In one embodiment, executing 550 the function also includes transmitting the function output from the data platform 180 or MVNE system 100 back to the brand system 190.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method for implementing functions customized to a branded company comprising:
   (a) receiving a standardized interface module, the standardized interface module including required components and optional components;
   (b) generating a brand-specific interface including the required components and one or more optional components;
   (c) associating the brand-specific interface with the branded company;
   (d) storing the brand-specific interface on a data platform, wherein the data platform is located remotely from a plurality of user devices; and
   (e) using the brand-specific interface stored at the data platform to execute a function based on a request from a user device from the plurality of user devices.

2. The method of claim 1, further comprising:
   transmitting the brand-specific interface to a remote location.

3. The method of claim 1 wherein associating the brand-specific interface with the branded company comprises:
   (a) generating a brand-specific interface identifier; and
   (b) associating the brand-specific interface identifier with the branded company.

4. The method of claim 1, wherein the standardized interface module comprises data describing at least one of an input and an output of a wireless communication function.

5. The method of claim 4, wherein the data describing at least one of the input and the output of the wireless communication function comprises a data format, a data type or a data value.

6. The method of claim 1, wherein using the brand-specific interface stored at the data platform to execute the function based on the request from the user device from the plurality of user devices comprises:
   (a) generating content in response to the request from the user device;
   (b) transmitting the generated content from the data platform to an MVNE system located remotely from the user device and the data platform for validation that a user associated with the user device is authorized to receive the generated content; and
   (c) based on receiving the validation from the MVNE system, providing the generated content to the user device.

7. The method of claim 4, wherein the data describing at least one of the input and the output of the wireless function comprises an extensible markup language (XML) schema specifying a data format and a data content.

8. A computer program product for implementing functions customized to a branded company, the computer program product comprising a non-transitory computer-readable medium containing computer program code for performing a method comprising:
   (a) receiving a standardized interface module, the standardized interface module including required components and optional components;
   (b) generating a brand-specific interface including the required components and one or more optional components;
   (c) associating the brand-specific interface with the branded company; and
   (d) storing the brand-specific interface on a data platform, wherein the data platform is located remotely from a plurality of user devices; and
   (e) using the brand-specific interface stored at the data platform to execute a function based on a request from a user device from the plurality of user devices.

9. The computer program product of claim 8, wherein associating the brand-specific interface with the branded company comprises:
   (a) generating a brand-specific interface identifier; and
   (b) associating the brand-specific interface identifier with the branded company.

10. The computer program product of claim 8, wherein the standardized interface module comprises data describing at least one of an input and an output of a wireless communication function.

11. The computer program product of claim 10, wherein the data describing at least one of the input and the output of the wireless communication function comprises a data format, a data type or a data value.

12. The computer program product of claim 10, wherein the data describing at least one of the input and the output of the wireless function comprises an extensible markup language (XML) schema specifying a data format and a data content.

13. A method for implementing functions customized to a branded company comprising:
   (a) receiving a standardized interface module, the standardized interface module including required components and optional components, wherein the standardized interface module comprises an extensible markup language (XML) schema specifying a format and data contents for a wireless communication function;
   (b) generating a brand-specific interface including the required components and one or more optional components;
   (c) associating the brand-specific interface with the branded company by generating a brand-specific interface identifier and associating the brand-specific interface identifier with the brand-specific interface and the branded company; and
   (d) storing the brand-specific interface on a data platform, wherein the data platform is located remotely from a wireless communication device; and
   (e) using the brand-specific interface stored at the data platform to execute the wireless communication function based on a request from the wireless communication device.

14. A method for brand-company specific execution of a function comprising:
   receiving a request to execute the function;
   determining a brand system associated with the received request;
   determining a brand-specific interface associated with the determined brand system, the brand-specific interface including a plurality of required components and one or more optional components, the optional components selected by the brand system;
   executing the function using the determined brand-specific interface; and
   storing an output generated by the function execution.

15. The method of claim 14, wherein determining the brand-specific interface associated with the determined brand system comprises:

associating a brand system identifier with the received request, the brand system identifier uniquely identifying the brand system;
comparing the associated brand system identifier with one or more stored brand-system identifiers;
responsive to matching the brand system identifier associated with the received request with a stored brand system identifier corresponding to the brand specific interface, retrieving the brand-specific interface.

16. The method of claim 15, wherein:
(a) the brand specific interface is retrieved from a database storing one or more brand specific interfaces operable to execute the requested function;
(b) each brand specific interface operable to execute the requested function corresponds to a brand-system identifier from the one or more stored brand system identifiers; and
(c) each brand-system identifier from the one or more brand system identifiers corresponds to a different brand company.

17. The method of claim 14, wherein:
(a) the request to execute the function is received from a wireless communication device;
(b) receiving the request to execute the function and determining the brand system associated with the received request are performed using a MVNE system located remotely from the wireless communication device; and
(c) executing the function using the determined-brand specific interface is performed at a location remote from the wireless communication device.

\* \* \* \* \*